United States Patent [19]

Namekawa

[11] Patent Number: 4,780,837

[45] Date of Patent: Oct. 25, 1988

[54] DOPPLER SIGNAL FREQUENCY CONVERTER

[75] Inventor: Kouroku Namekawa, Tokyo, Japan

[73] Assignee: Aloka Co., Ltd., Tokyo, Japan

[21] Appl. No.: 746,998

[22] Filed: Jun. 19, 1985

[30] Foreign Application Priority Data

Jun. 23, 1984 [JP] Japan ............... 59-128423
Feb. 4, 1985 [JP] Japan ............... 60-018635

[51] Int. Cl.⁴ .................................. G01P 11/00
[52] U.S. Cl. ................... 364/565; 364/510; 128/661.09; 73/861.25
[58] Field of Search ............ 73/861.25, 25; 128/663, 128/665, 666; 342/104, 194, 115; 367/90; 364/565, 510

[56] References Cited

U.S. PATENT DOCUMENTS

| | | | |
|---|---|---|---|
| 4,103,679 | 8/1978 | Aronson | 73/861.25 |
| 4,257,278 | 3/1981 | Papadofrangakis et al. | 128/663 |
| 4,265,126 | 5/1981 | Papadofrangakis et al. | 128/663 |
| 4,324,258 | 4/1982 | Huekscher et al. | 73/861.25 |
| 4,334,543 | 6/1982 | Fehr | 128/663 |
| 4,534,357 | 8/1985 | Powers | 128/663 |
| 4,554,926 | 11/1985 | Shiraska | 128/663 |
| 4,573,477 | 3/1986 | Namekawa et al. | 128/663 |
| 4,583,409 | 4/1986 | Lannuzel et al. | 128/663 |
| 4,608,568 | 8/1986 | Egawa | 367/90 |
| 4,622,977 | 11/1986 | Namekawa et al. | 128/663 |

Primary Examiner—Errol A. Krass
Attorney, Agent, or Firm—Koda and Androlia

[57] ABSTRACT

A Doppler signal frequency converter for use in an apparatus used to detect and measure the velocity of movement of an object by picking up the reflections of ultrasonic waves beamed at the subject of examination. The converter is provided with one or a plurality of complex signal converters, and a complex multiplier which computes the conjugate and complex products of the complex signals. The complex signal converter converts the Doppler signals to a plurality—for example two—complex signals which differ in frequency. By carrying out computations based on the real and imaginary parts of the complex signals, the conjugate and complex products of the two complex signals are obtained. These conjugate and complex products are Doppler signals having a frequency which enables a wide range of velocity components to be detected, the conjugate product enabling the velocity of a distant rapidly-moving object to be measured accurately, while the complex product provides accurate measurement of the velocity of a slow-moving object.

5 Claims, 4 Drawing Sheets

DOPPLER SIGNAL FREQUENCY CONVERTER

BACKGROUND OF THE INVENTION

1. Field of the Invention

This invention relates to a Doppler signal frequency converter. More particularly, this invention relates to an improved Doppler signal frequency converter for use in an apparatus employing ultrasonic waves to detect and measure the velocity of movement of an object.

2. Description of the Prior Art

Doppler pulse devices are widely used wherein an ultrasonic pulse beam is transmitted into an object at a fixed repetition frequency and the reflection from the object is picked up and the distance to the object is measured by comparing the time difference between the transmitted signals and the received signals, and at the same time the velocity of movement of the object is detected and measured by detecting changes in the frequency of the received signal.

Generally, the repetition frequency of the pulse beam is selected according to the distance to the object. However, in the case of measurement of an object which is distantly located, if the frequency selected is high compared with the repetition frequency selected on the basis of the distance to the object of examination, it is well-known that an aliasing echo is produced which indicates that the object is closer than is actually the case, making discrimination of the distance difficult.

A similar phenomenon is seen in the case of measurement of the velocity of the object. If the repetition frequency selected is low compared with the Doppler frequency arising from the velocity of the object, the aliasing echo results in a low frequency, making discrimination of the velocity difficult.

In order to measure both distance and velocity without production of aliasing echo, it is known that the relationship between a maximum Doppler frequency fd and pulse repetition frequency fr has to conform to $fd = fr/2$ in the case of a device able to detect not only absolute velocity but also whether it is positive or negative, and $fd = fr$ in the case of a device which detects and measures only the absolute velocity.

Here, in the case of a device able to discriminate whether velocity is positive or negative, from $$fd = fo \cdot k \cdot V = fr/2$$

(fo: ultrasonic pulse beam frequency,
k: constant, V: maximum velocity)
the maximum measurable velocity V is $$V = fr/(2fo \cdot k).$$

However, as can be understood from the above formula, there is a drawback that if the pulse repetition frequency fr is increased in order to increase the maximum measurable velocity V, there is a decrease in the maximum distance at which the object can be measured without the production of aliasing echo, therefore measurement of the velocity is not possible in the case of a distant rapidly-moving object.

Another problem has been that if a low ultrasonic beam frequency is selected, not only is it difficult to produce a transmission wave with a narrow pulse width, but it is also impossible to form a finely focussed beam, the result being a decrease in distance resolution and directional resolution, thus rendering impossible simultaneously to establish the distance to and the velocity of a distantly located rapidly-moving object.

SUMMARY OF THE INVENTION

In view of the foregoing problems, an object of the present invention is to provide a Doppler signal frequency converter which enables the distance to and velocity of a distantly located object which is moving rapidly or slowly to be obtained with good precision.

In order to obtain this objective, this invention is characterized by being provided with a complex signal converter in which a Doppler signal obtained by picking up and amplifying the reflection of a periodic pulse modulated wave beamed at a moving object is mixed with a complex reference signal and demodulated to convert the Doppler signal to a complex signal, and a complex multiplier which computes the conjugate product and the complex product of said complex signal, whereby the Doppler signal obtained from the object is arithmetically processed into a plurality of complex signals of differing frequencies to thereby obtain Doppler signals of frequencies which enable a wide range of velocity components to be detected.

This invention is also characterized by being provided with a plurality of complex signal converters in which a Doppler signal obtained by picking up and amplifying the reflections of a periodic pulse modulated wave beamed at a moving object is mixed with complex reference signals and demodulated to convert the Doppler signal to a plurality of complex signals, and a complex multiplier which computes the conjugate products and the complex products of said plurality of complex signals, whereby the Doppler signal obtained from the object is arithmetically processed into a plurality of complex signals of differing frequencies to convert the Doppler signal to frequencies which enable a wide range of velocity components to be detected.

In order to obtain two complex signals, this invention can be configured so that the Doppler signal obtained from the object is amplified and split by two band pass filters having different pass bands and passed to two complex signal converters, or it can be configured so that, without the use of the above filters, the signal is passed to two converters, one a complex signal converter for complex conversion using a reference signal of a frequency higher than the Doppler signal carrier frequency, and the other a complex signal converter for complex conversion using a reference signal of a frequency lower than the Doppler signal carrier frequency.

This invention is further characterized by being provided with a plurality of complex signal converters in which a Doppler signal obtained by picking up and amplifying the reflection of a periodic pulse modulated wave beamed at a moving object at periods which are integer multiples of the repetition period is mixed with a complex reference signal and demodulated to convert the Doppler signal to a complex signal, a delay line which delays the input complex signal by a period which is an integer multiple of the repetition period, and a complex multiplier which computes the complex product and the conjugate product of the delay line input complex signal and output complex signal, whereby the Doppler signal obtained from the moving object is converted to Doppler signals of desired frequencies.

With the above configuration, the Doppler signal obtained from within the body of the subject being examined and containing the movement velocity components is converted to a plurality of complex signals, for example two. The two signals are then converted by a complex multiplier to Doppler signals having frequencies which enable detection of a wide range of velocity components.

That is, the conjugate and complex products of said two complex signals are computed, the conjugate products enabling the velocity of a distantly located rapidly-moving object to be obtained with accuracy, and the complex products enabling the velocity of a slow-moving object to be obtained with accuracy.

DESCRIPTION OF THE PREFERRED EMBODIMENTS

First Embodiment

Figure 1:
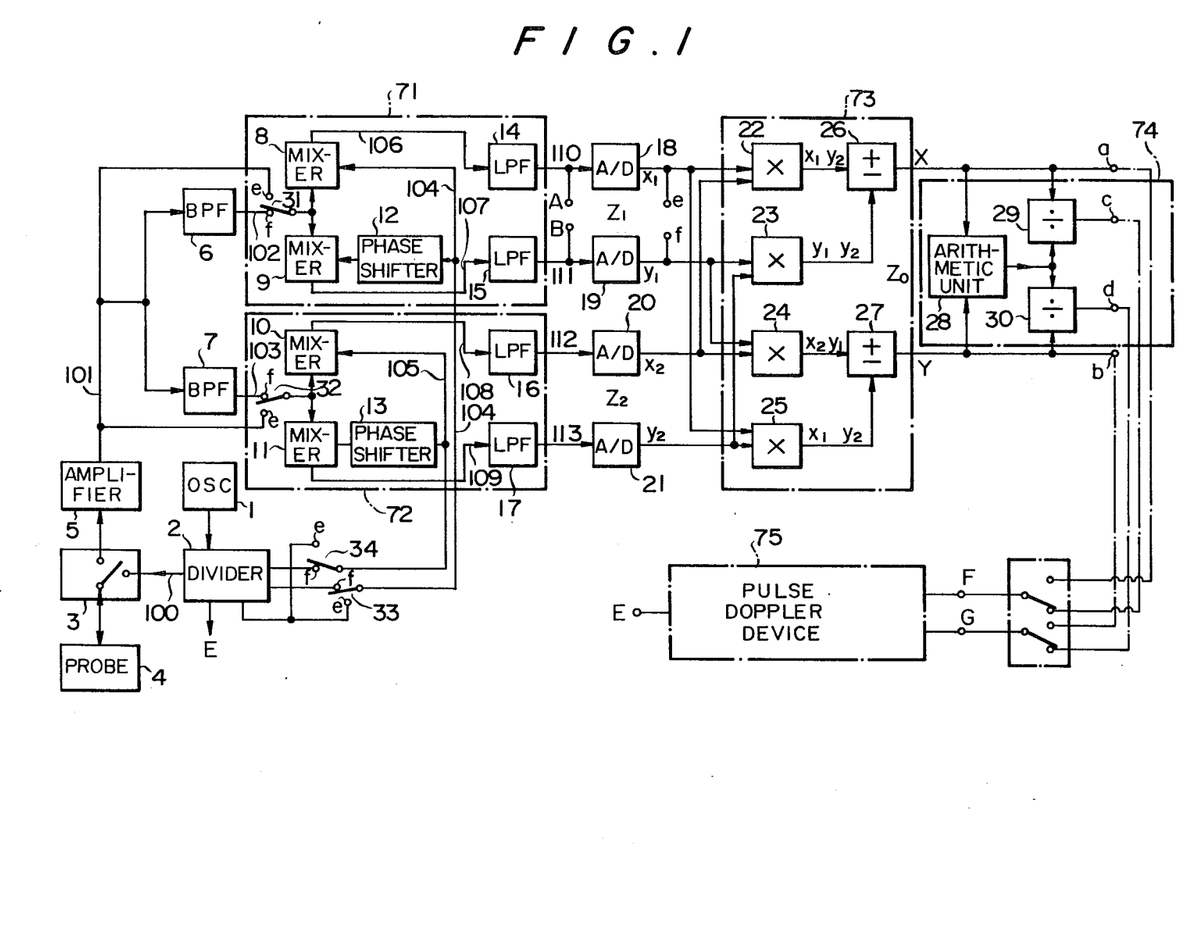
FIG. 1 is a block circuit diagram of a first preferred embodiment of the Doppler signal frequency converter according to the present invention.

With reference to FIG. 1 which shows the first embodiment according to this invention applied to an apparatus for detecting and measuring blood flow in the body, a stable high frequency signal is output by an oscillator 1 to a frequency divider and sync generator 2 which outputs the various synchronizing signals required, such as repetition frequency signal, clock pulse signal, reference signal, and control pulse signal. A fixed repetition frequency (for example, 4 kHz) control pulse signal 100 goes via a duplexer 3 to a probe 4 where it is converted to ultrasonic pulses which are beamed into the subject.

The pulses reflected from the subject are picked up by the probe 4 after a delay which corresponds to the distance between the probe 4 and the object and are converted by the probe 4 to electrical signals. These electrical signals then go via the duplexer 3 to a high frequency amplifier 5 which amplifies them, following which they are converted to complex signals and subjected to the required signal processing.

The first embodiment is characterized in that a single Doppler signal obtained from the object is converted to two complex signals by two complex signal converters, and a signal 101 output by the high frequency amplifier 5 is input to band pass filters 6, 7.

Figure 2A:
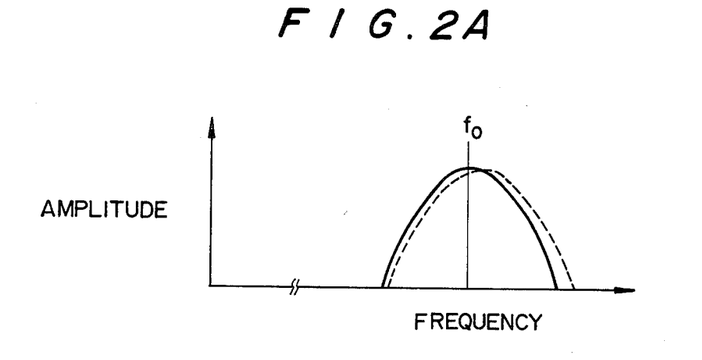
FIGS. 2A–2C show spectral diagrams illustrating frequency converted Doppler signals.

The spectrum of the signal 101 is the line spectrum produced by the repetition frequency (4 kHz). The envelope of the spectrum depends on the width of the driving pulse and the probe characteristics; for example, as shown in FIG. 2A, it is a broad-based spectrum with a center frequency of 3 MHz. Also, signal 101 is passed through filters 6, 7 having the differing band-pass characteristics indicated by 6f and 7f in FIG. 2B, and the spectrums of the signals 102, 103 output by filters 6, 7 have different envelopes, as shown in FIG. 2C, one having a center frequency of 2.9 MHz (6s) and the other a center frequency of 3.1 MHz (7s).

Figure 2B:
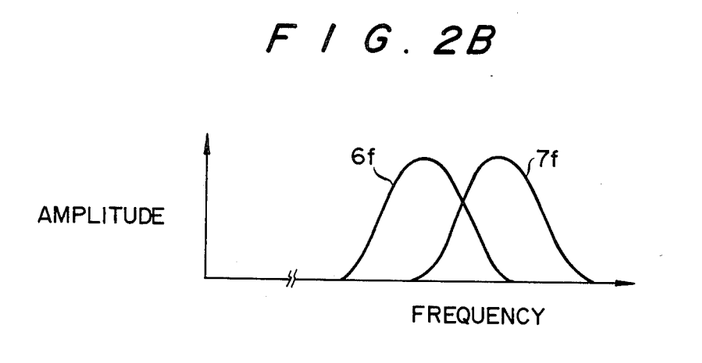
Figure 2C:
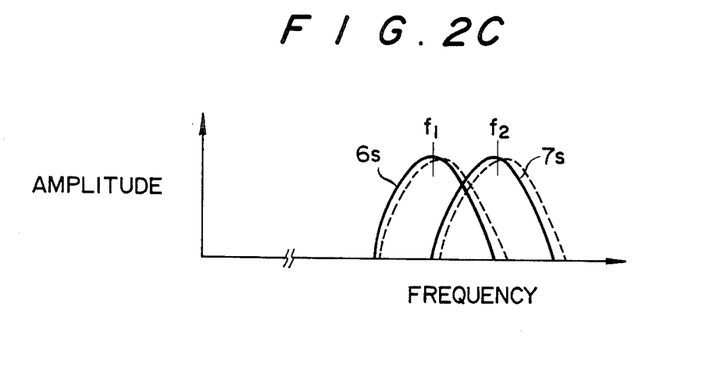

As is generally known, when measuring a moving object, the frequency of the received signal undergoes a Doppler shift that is proportional to the velocity of the object and the frequency of the transmitted signal, so that when the moving object approaches the probe the spectral envelope changes, as shown by the dashed lines in FIG. 2.

Therefore there is also a change in the envelope of the output spectrum of filters 6, 7. In particular, because the frequency component of the spectrum 7s is higher than the frequency component of the spectrum 6s, the envelope undergoes a larger shift.

The output signals 102, 103 obtained thus from the filters 6, 7 are input to the complex signal converters 71, 72 and converted to complex signals. Complex signal converter 71 is comprised of a pair of mixers 8, 9, a 90° phase shifter 12 and a pair of low pass filters 14, 15. Complex signal converter 72 is similarly comprised of a pair of mixers 10, 11, a 90° phase shifter 13 and a pair of low pass filters 16, 17. The signal conversion at the complex signal converters 71, 72 will now be explained.

The output spectrums 6s, 7s of signals 102, 103 are formed of many line spectrums which are integer multiples of the repetition frequency, but for simplicity of explanation we shall describe a single center frequency spectrum. Signals 102, 103 can be expressed by the following formulas.

$$A\cos 2\pi(f_1 + kf_1v)t \tag{1}$$

$$A\cos 2\pi(f_2 + kf_2v)t \tag{2}$$

where $f_1$, $f_2$ are the frequencies, A is the amplitude and t is the time. Here, k is a proportional constant, v is the velocity and $kf_1v$ and $kf_2v$ are the amounts of frequency change caused by the Doppler effect.

Signal 102 is then input to mixers 8, 9 via terminal 31f of switch 31, while reference signal 104 from frequency divider and sync generator 2 provides another input to mixers 8, 9 via terminal 33f of switch 33. The reference signal 104 is input to mixer 8 at a continuous wave frequency $f_1$ (2.9 MHz) which is an integer multiple of the repetition frequency. The other reference signal 104 is phase-shifted 90° by phase shifter 12 and input into mixer 9. Therefore, the reference signals input to mixers 8, 9 are 90° out of phase with each other. If the amplitude thereof is taken as 1 the signals can be expressed by the following formulas:

$$\cos 2\pi f_1 t \tag{3}$$

$$\sin 2\pi f_1 t \tag{4}$$

Taking formula (3) as expressing a real part of a complex signal and formula (4) as an imaginary part of one, combining the two formulas gives the complex reference signal, so the signals computed and output by mixers 8, 9 are in a mutual complex relationship. As a result, of the signals output by mixers 8, 9 there is a signal 106 which is proportional to the product of formulas (3) and (1). Inputting this signal 106 as expressed by the formula:

$$A\cos 2\pi f_1 kvt + A\cos 2\pi(2f_1 + f_1kv)t \tag{5}$$

to low pass filter 14 which cuts off frequency components of 500 kHz and above eliminates the high frequency component $2f_1$ (5.8 MHz) of formula (5), forming an output signal 110 expressed by the formula:

$$A\cos 2\pi f_1 kvt \tag{6}$$

Similarly, mixer 9 produces an output which is proportional to the products of formulas (1) and (4). The signal 111 output from low pass filter 15 is expressed by the formula:

$$A\sin 2\pi f_1 kvt \tag{7}$$

Combining the signals of formulas (6) and (7) produces a complex signal that can be expressed by the formula:

$$z_1 = A\{\cos 2\pi f_1 kvt + i\sin 2\pi f_1 kvt\} = x_1 + iy_1 \tag{8}$$

Here, i is the complex signal symbol, and $x_1$, $y_1$ are as expressed by the formula:

$$x_1 = A\cos 2\pi f_1 kvt,$$

$$y_1 = A\sin 2\pi f_1 kvt \tag{9}$$

At complex signal converter 72, the frequency of the complex reference signal is a continuous wave frequency $f_2$ (3.1 MHz) which is an integer multiple of the repetition frequency. Expressing output signals 112, 113 by means of a complex formula, as with complex signal converter 71, we get the following.

$$z_2 = A\{\cos 2\pi f_2 kvt + i\sin 2\pi f_2 kvt\} = x_2 + iy_2 \tag{10}$$

Here, $x_2$, $y_2$ are expressed by the formula:
$$x_2 = A\cos 2\pi f_2 kvt,$$
$$y_2 = A\sin 2\pi f_2 kvt \tag{11}$$

In order to improve the computing precision of the analog signals $Z_1$, $Z_2$ thus obtained, they are converted to digital signals by A/D converters 18, 19, 20, 21, and the resulting digital signals $x_1$, $y_1$, $x_2$, $y_2$ are input to a complex multiplier 73 comprised of multipliers 22, 23, 24, 25 and adder-subtracters 26, 27.

Signals $x_1 \cdot x_2$, $y_1 \cdot y_2$, $x_2 \cdot y_1$, and $x_1 \cdot y_2$ are computed by multipliers 22, 23, 24, 25 respectively, and the outputs of multipliers 22, 23 are input to adder-subtracter 26 and the outputs of multipliers 24, 25 are input to adder-subtracter 27.

Calculation Of Conjugate Product

If the adder-subtracter 26 is operated as an adder and the adder-subtracter 27 as a subtracter, the X, Y of the output $Z_o$ (X, Y) of complex multiplier 203 are expressed by the formulas:

$$X = x_1 \cdot x_2 + Y_1 \cdot Y_2 \tag{12}$$

$$Y = x_2 \cdot Y_1 - x_1 \cdot Y_2 \tag{13}$$

As shown by the following formula, X, Y are the real part and the imaginary part of the conjugate product of $Z_1$ and $Z_2$ of formulas (8) and (10).

$$\begin{aligned} Z_0 &= Z_1^* \cdot Z_2 \\ &= (x_1 - iy_1)(x_2 + iy_2) \\ &= x_1 \cdot x_2 + y_1 \cdot y_2 + i(x_1 \cdot y_2 - x_2 \cdot y_1) \\ &= X + iY \end{aligned} \tag{14}$$

Substituting formulas (9) and (11) into formulas (12) and (13) gives the following formulas.

$$\begin{aligned} X &= A^2\{\cos 2\pi f_1 kvt \cdot \cos 2\pi f_2 kvt + \\ &\quad \sin 2\pi f_1 kvt \cdot \sin 2\pi f_2 kvt\} \\ &= A^2 \cos 2\pi (f_2 - f_1) kvt \end{aligned} \tag{15}$$

$$\begin{aligned} Y &= A^2\{\cos 2\pi f_1 kvt \cdot \sin 2\pi f_2 kvt - \\ &\quad \sin 2\pi f_1 kvt \cdot \cos 2\pi f_2 kvt\} \\ &= A^2 \sin 2\pi (f_2 - f_1) kvt \end{aligned}$$

The outputs X, Y of complex multiplier 73 thus obtained are input to an amplitude calculator 74 comprised of a root calculator 28 and dividers 29, 30 to obtain the amplitude. The root calculator 28 calculates amplitude A by means of the following formula.

$$(X^2 + Y^2)^{1/4} = (A^4)^{1/4} = A \tag{17}$$

The output of root calculator 28 is fed to the dividers 29, 30. Signals X and Y which are input to dividers 29 and 30 respectively via other input terminals are divided by the signal output by the root calculator 28, i.e., by A. Therefore, the outputs from terminals c and d of dividers 29 and 30 as obtained by formulas (15), (16), (17) are given by the following formulas.

$$A\cos 2\pi (f_2 - f_1) kvt \tag{18}$$

$$A\sin 2\pi (f_2 - f_1) kvt \tag{19}$$

Amplitude A can also be obtained from the output of the A/D converters. For example, if signals x, y output by complex signal converter 71 and obtained at the output terminals e and f of A/D converters 18 and 19 are input to calculator 26 instead of X and Y, it is possible to calculate amplitude A by the following formula (17').

$$(x^2 + y^2)^{1/2} = (A^2)^{1/2} = A \tag{17'}$$

Calculation Of Complex Product

If the above is reversed and adder-subtracter 26 is operated as a subtracter and adder-subtracter 27 as an adder, formulas (12) and (13) change to the following formulas.

$$X' = x_1 \cdot x_2 - Y_1 \cdot Y_2 \tag{20}$$

$$Y' = x_2 \cdot Y_1 + x_1 \cdot Y_2 \tag{21}$$

Here, X', Y' become the real part and the imaginary part of the complex product of $Z_1$ and $Z_2$ of formulas (8) and (10), as shown in the following formula.

$$\begin{aligned} Z_0' &= Z_1 \cdot Z_2 \\ &= (x_1 + iy_1)(x_2 + iy_2) \\ &= x_1 \cdot x_2 - y_1 \cdot y_2 + \\ &\quad i(x_2 \cdot y_1 + x_1 \cdot y_2) \\ &= X' + iY' \end{aligned} \tag{22}$$

If formula (22) is computed in the same way as formulas (15) and (16), the result is the following formulas (23) and (24).

$$X' = A^2 \cos 2\pi (f_1 + f_2) kvt \tag{23}$$

$$Y' = A^2 \sin 2\pi(f_1 + f_2)kvt \tag{24}$$

Division by A in the dividers 29, 30 gives an output from terminals c and d expressed by the following formulas.

$$A\cos 2\pi(f_2+f_1)kvt \tag{25}$$

$$A\sin 2\pi(f_2+f_1)kvt \tag{26}$$

The conjugate product and the complex product of the complex signals thus obtained both enable a wide range of velocity components of a moving object to be detected, the conjugate product providing more precision with respect to a rapidly-moving object and the complex product more precision with respect to a slow-moving object, compared with conventional types. This will now be explained, using for comparison a reference signal of the same frequency.

When the switches 31, 32, 33, 34 are toggled to the e terminal, signal 101 is applied to mixers 8, 9, 10, 11 and at the same time the frequency of the reference signal input via the other terminals is changed to a continuous wave frequency $f_o$ which is an integer multiple of the repetition frequency.

In the case of the conjugate product, operation at this time is the same as when $f_1$ and $f_2$ of formulas (25) and (26) are equal to $f_o$, hence the following formulas can be given.

$$A\cos 4\pi f_0 kvt \tag{25'}$$

$$A\sin 4\pi f_0 kvt \tag{26'}$$

At this time, operation with only converter 71 is the same as operation at the above frequency $f_1$, therefore signals 110 and 111 obtained from terminals A and B are expressed by the following formulas.

$$A\cos 2\pi f_0 kvt \tag{27}$$

$$A\sin 2\pi f_0 kvt \tag{28}$$

These signals are the same as the signals output by the conventional orthogonal detectors. Therefore, if formulas (27) and (28) are compared with the formulas (18) and (19) obtained using this embodiment of the present invention, it can be seen that an identical Doppler signal is obtained when a frequency of $f_2 - f_1$ (3.1 MHz − 2.9 MHz), i.e., 200 kHz, is used for the transmission signal, instead of center frequency $f_o$.

Thus, in accordance with this first embodiment, the Doppler signal obtained when $f_o$ is in effect changed to $f_2 - f_1$, without any actual change to repetition frequency fr or transmission frequency $f_o$, as $f_o$ is 3 MHz and $f_2 - f_1$ is 200 kHz, when the comparison is with 3 MHz it becomes possible to measure a maximum velocity 15 times higher. In addition, appropriate selection of $f_1$ and $f_2$ will enable the multiplication factor to be set to any desired value.

In the case of the complex product, the signals output from terminals c and d, expressed by formulas (25) and (26), or (25') and (26') form the Doppler signal when transmission is at $f_1 + f_2$ (2.9 MHz + 3.1 MHz = 6 MHz) or $2f_0$ (2×3 MHz = 6 MHz), meaning that in effect the Doppler signal obtained is the same as that obtained when a 6 MHz signal is beamed at the object, making possible the precise measurement of slow-moving objects, without changing fr and $f_0$.

In the first embodiment, the two complex signals are obtained from the Doppler signal split by band pass filters 6 and 7 prior to being forwarded to complex signal converters 71, 72; however, it is possible to dispense with the use of the filters 6, 7 and instead to use just two complex signal converters to produce two complex signals having different frequencies. Specifically, with reference to FIG. 1, by setting switches 31, 32 to the e side the signal 101 output by high-frequency amplifier 5 can be fed directly to complex signal converters 71, 72, instead of to the filters 6, 7. Then, a reference signal that is of a lower frequency $f_1$ (for example, 2.75 MHz) than the Doppler carrier frequency $f_0$ (3 MHz) from the frequency divider and sync generator 2 is applied to the mixers 8, 9 of complex signal converter 71, and a reference signal of a higher frequency $f_2$ (for example, 3.25 MHz) than the carrier frequency is applied to the mixers 10, 11 of complex signal converter 72. In this case, as the cut-off frequency of the low pass filters 14, 15, 16, 17 is set at 250 kHz, a spectrum range of $f_1 \pm 250$ kHz is detected, appearing as the output of low pass filters 14, 15. Likewise, the output of low pass filters 16, 17 is detected as a spectrum of $f_2 \pm 250$ kHz. Because this has the same effect as inserting the band pass filters 6, 7, the Doppler signal obtained is the same as that obtained using a transmission frequency of $f_2 - f_1$ (0.5 MHz). Therefore, as carrier frequency $f_0$ is 3 MHz, it is possible to measure a maximum velocity that is six times higher, without changing the transmission frequency.

In this first embodiment, the computation of formula (17) is done by the root calculator 28 of amplitude calculator 74. However, if $$(X^2 + Y^2)^{\frac{1}{2}} = (A^4)^{\frac{1}{2}} = A^2 \tag{29}$$

is computed, the following signals will appear at terminals c and d of amplitude calculator 74.

$$\cos 4\pi f_0 kvt \tag{30}$$

$$\sin 4\pi f_0 kvt \tag{31}$$

These signals do not include amplitude A but do contain Doppler information. Therefore this offers the convenience that when the amplitude is not required, the width of the output change decreases, so signal processing can be carried out using a reduced number of output bits.

In addition, like the signals of terminals c and d, the signals of terminals a and b contain Doppler information, so it is possible to use the outputs of terminals a, b, c, d as phase detection video signals or orthogonal detection video signals.

Figure 3:
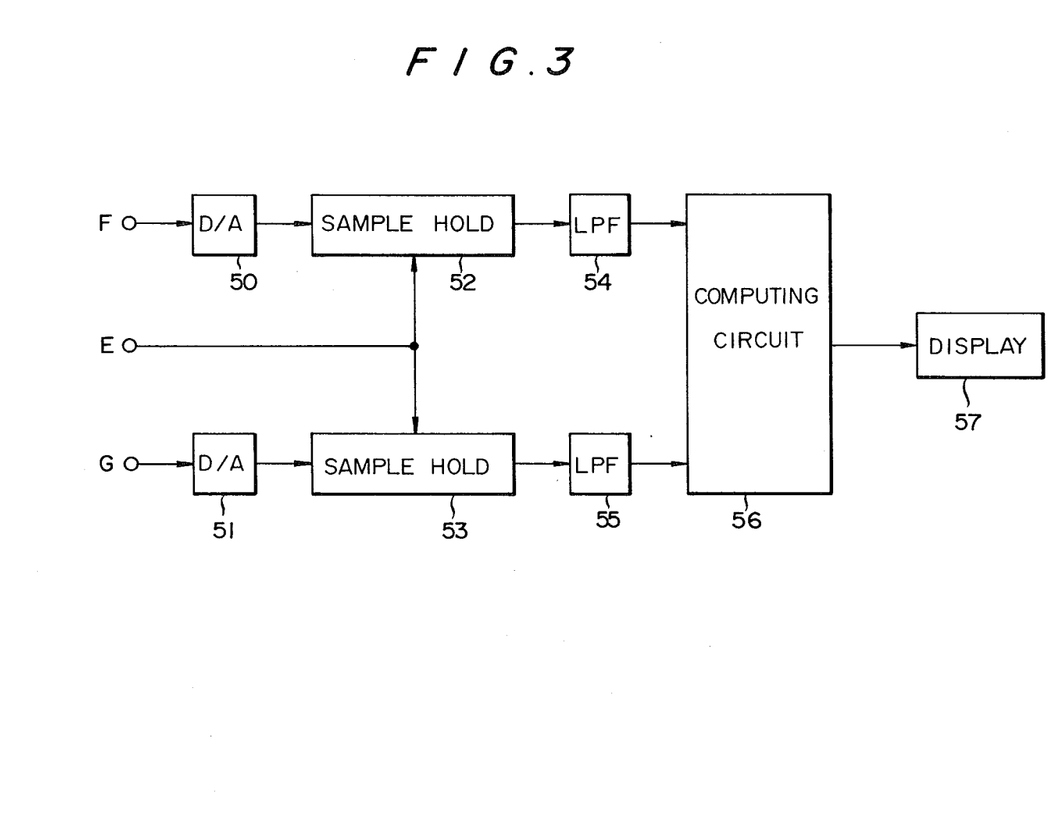
FIG. 3 is a block diagram of a Doppler pulse apparatus employing Doppler signals obtained with the device of the embodiment shown in FIG. 1.

FIG. 3 shows an apparatus (the portion 75 of FIG. 1) employing Doppler signals frequency-converted in accordance with the present invention; this is a type of Doppler pulse apparatus in general use, wherein the Doppler video signals from terminals c, d and a, b go to terminals F, G, are changed to analog signals by D/A converters 50, 51 and input to sampling hold circuits 52, 53. A sampling pulse from frequency divider and sync generator 2 (FIG. 1) is forwarded to terminal E and applied to sampling hold circuits 52, 53 with the delay of a set time after the transmission of each pulse, producing a Doppler signal from an object at the required distance (depth). After removal of extraneous signals by low pass filters 54, 55, the Doppler signal is input to computing circuit 56, the output of which goes to a display 57 which displays the computed velocity of the object.

It is also possible to provide the signals output from terminals a, b, c, d (FIG. 1) to other types of Doppler apparatuses, such as those requiring phase-detected video signals, for two-dimensional Doppler apparatus applications such as where flow velocity distribution is measured and displayed by obtaining the phase difference or correlation between the input and output of these video signals provided with a delay line the delay of which is equivalent to the repetition period, or a moving target indicator (MTI) type which detects the difference in amplitude between the input and output signals.

Second Embodiment

Figure 4:
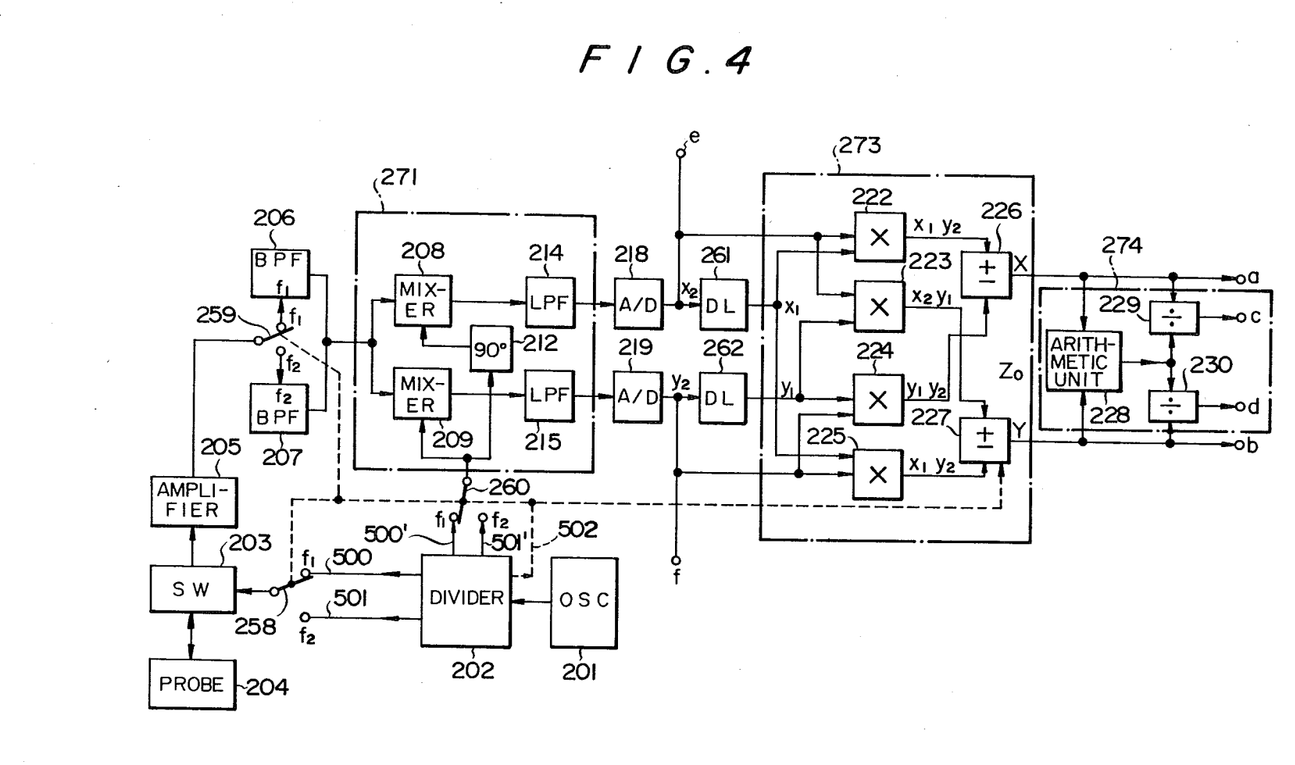
FIG. 4 is a block circuit diagram of a second preferred embodiment of the Doppler signal frequency converter according to the present invention.

FIG. 4 shows a second embodiment of this invention characterized by use of a plurality of ultrasonic waves of differing transmission frequencies which are time-divided for transmission, providing a plurality of complex signals.

As shown in the FIGURE, when for example the two types of ultrasonic waves having different frequencies are beamed at the body of the subject, the operation of this embodiment will now be explained.

The output 500 of frequency divider and sync generator 202 produces a burst pulse signal of a frequency $f_1$ (for example 2.5 MHz) at a fixed repetition frequency (for example 4 kHz), and drives a broadband probe 204 via electronic switch 258 and duplexer 203. Another output 501 of frequency divider and sync generator 202 produces a burst pulse signal of a frequency $f_2$ (for example 3 MHz) at the same repetition frequency, and by operating the electronic switch 258 in sync with the repetition frequency of the control pulse signal 502 of frequency divider and sync generator 202, the burst pulse signals fed to probe 204 are switched between frequencies $f_1$ and $f_2$ every other period. The two types of ultrasonic waves produced by the probe 204 are beamed at the body of the subject, and the waves reflected from the subject are picked up and converted to electrical signals by the probe 204. After the received signals are fed via the duplexer 203 to the amplifier 205 where they are amplified, electronic switch 259 functions to alternate their input every other period between band pass filters 206, 207.

The pass bands of filters 206, 207 are sufficiently broad with respect to the center frequencies $f_1, f_2$ of the repetition frequency, and they are adjusted so that when the input is being switched between the filters in sync with the transmission of signal frequencies $f_1, f_2$, the output amplitudes of the two filters are the same.

The outputs of filters 206, 207 are fed to complex signal converter 271 for conversion to complex signals. The complex signal converter 271 is comprised of a pair of mixers 208, 209, a 90° phase-shifter 212, and a pair of low pass filters 214, 215. The outputs of filters 206, 207 are input to mixers 208, 209 and mixed with a reference signal which is in sync with the repetition period and 90° out of phase. That is, the received signal of frequency $f_1$ is fed to band pass filter 206, and when it is applied to mixers 208, 209 a continuous wave reference signal is provided from the output 500' of frequency divider and sync generator 202 via electronic switch 260. The phase of this reference signal is then shifted 90° by the 90° phase shifter 212 for input to the mixer 208, while the other mixer 209 is fed with the unchanged reference signal. Frequency $f_2$ is subjected to the same process, and the outputs of mixers 208, 209 are supplied to the low pass filters 214, 215, the output of the low pass filter 214, corresponding to the expression of formula (6) of the first embodiment, gives rise to the following signals which appear alternately every other period.

$$A\cos 2\pi f_1 kvt$$
$$A\cos 2\pi f_2 kvt \qquad (6')$$

The output of low pass filter 215 likewise corresponds to formula (7), giving rise to a signal $$A\sin 2\pi f_1 kvt$$
$$A\sin 2\pi f_2 kvt \qquad (7')$$

Therefore, it is possible to obtain a pair of complex signals $Z_1$, $Z_2$, the real and imaginary parts thereof being formed by the outputs of low pass filters 214 and 215, respectively (this corresponding to formulas (8) and (10)). This is represented by the following formulas.

$$Z_1 = x_1 + iy_1$$

$$Z_2 = x_2 + iy_2$$

Here,
$$x_1 = A\cos 2\pi f_1 kvt$$

$$y_1 = A\sin 2\pi f_1 kvt$$

$$x_2 = A\cos 2\pi f_1 kvt$$

$$y_2 = A\sin 2\pi f_2 kvt$$

The complex signals $Z_1$, $Z_2$ thus obtained are forwarded via A/D converters 218 and 219 to delay lines 261 and 262 which delay the transmission signal by one period (or an integer multiple thereof). While these delay lines 261, 262 may be of any type in general use, in this embodiment, for higher precision, the digital signals are read out after being stored in a memory for the duration of one period. Therefore, if digital signals $x_1$, $y_1$ are input to delay lines 261, 262, signals $x_2$, $y_2$ are read out, while if $x_2$, $y_2$ are input to the delay lines 261, 262, signals $x_1$, $y_1$ will be output. The four digital signals then are forwarded to complex multiplier 273 which is comprised of multipliers 222, 223, 224, 225 and adder-subtracters 226, 227. The complex multiplier 273 performs the same type of computation as in the first embodiment, to provide the conjugate and complex products of the two complex signals $Z_1$ and $Z_2$. Therefore, the conjugate product expressed by formulas (18) and (19) can also be obtained in the second embodiment.

$$A\cos 2\pi (f_2 - f_1) kvt \qquad (18')$$

$$A\sin 2\pi (f_2 - f_1) kvt \qquad (19')$$

Likewise, the complex product expressed by formulas (25) and (26) also can be obtained.

$$A\cos 2\pi (f_2 + f_1) kvt \qquad (25')$$

$$A\sin 2\pi (f_2 + f_2) kvt \qquad (26')$$

Thus, with the second embodiment, without any major change to the repetition frequency or transmission frequency, Doppler signals are obtained which in effect are those provided by a change in the transmission frequency of $f_2-f_1$ or $f_1+f_2$. In the former case, as $f_2-f_1=500$ kHz, compared with the conventional transmission frequency of 3 MHz, there is a 6-fold increase in the maximum measurable velocity. In the latter case, the Doppler wave obtained is based on an ultrasonic wave beam of a frequency of $f_1+f_2$, i.e., 5.5 MHz, which enables the velocity of a slow-moving object to be measured with precision.

It has been seen that in accordance with the second embodiment, by beaming a plurality of ultrasonic waves of differing frequencies at differing times, it is possible, without any major change to the frequency of the transmitted ultrasonic wave, to convert to a Doppler signal frequency which enables detection of a wide range of velocity components of a moving object, and the accurate measurement of the velocity thereof.

In accordance with the present invention it is therefore possible to accurately measure the distance to and the velocity of a distantly located rapidly-moving object, and it is also possible to measure, with an accuracy greater than hitherto possible, the velocity of a slowly-moving object.

I claim:

1. A Doppler signal frequency converter comprising a plurality of complex signal converters in which a Doppler signal obtained by picking up and amplifying the reflection of a periodic pulse modulated wave beamed at a moving object at periods which are integer multiples of a repetition period is mixed with a complex reference signal and demodulated to convert the Doppler signal to an output complex signal, a delay line which delays an input complex signal by a period which is an integer multiple of the repetition period, and a complex multiplier which computes the complex products and the conjugate products of the input complex signal which has been delayed by the delay line and the output complex signal, whereby the Doppler signal obtained from the object is converted to Doppler signals of frequencies which enable a wide range of velocity components to be detected.

2. A Doppler signal frequency converter according to claim 1 provided with an amplitude calculator comprised of a root calculator which computes the root of the sum of the square of the real parts of the complex signals outputted by said complex multiplier, and a divider which divides the output conjugate products and complex products of said complex multiplier by the output from said root calculator.

3. A Doppler signal frequency converter comprising a plurality of complex signal converters in which a Doppler signal obtained by picking up and amplifying the reflections of a periodic pulse modulated wave beamed at a moving object which has been split into two signals by a band pass filter having different pass bands is mixed with complex reference signals having higher and lower frequencies than a carrier signal of said Doppler signal and demodulated to convert the Doppler signal to a plurality of complex signals, a complex multiplier which computes the conjugate products and the complex products of said plurality of complex signals, and an amplitude calculator comprised of a root calculator which computes the root of the sum of the square of the real parts of the complex signals outputted by said complex multiplier and a divider which divides the output conjugate products and complex products of said complex multiplier by the output from said root calculator, whereby the Doppler signal obtained from the object is arithmetically processed into a plurality of complex signals of differing frequencies which enable a wide range of velocity components to be detected.

4. A Doppler signal frequency converter according to claims 1 or 3 wherein the Doppler signal is picked up by a plurality of different receiving frequency bands which are repetitively switched synchronously at a set frequency.

5. A Doppler signal frequency converter according to claim 1 or 3 wherein the complex signal converters repetitively change the frequency of complex reference signals synchronously at a set frequency.

* * * * *